United States Patent

Schuller et al.

[15] 3,691,318

[45] Sept. 12, 1972

[54] PRESSURE PICKUP TRANSDUCERS FOR MECHANICALLY STORED SIGNALS

[72] Inventors: Eduard Schuller, D-2 Wedel/Holstein; Horst Redlich, Berlin; Gerhard Dickopp, Berlin; Hans-Joachim Klemp, Berlin, all of Germany

[73] Assignee: TED Bildplatten Aktiengesellschaft Aeg-Telefunken-Teldec, Zug, Switzerland

[22] Filed: May 17, 1971

[21] Appl. No.: 144,116

Related U.S. Application Data

[63] Continuation-in-part of Ser. No. 798,709, Feb. 12, 1969, Pat. No. 3,652,809.

[30] Foreign Application Priority Data

May 15, 1970 Germany..........P 20 25 032.2

[52] U.S. Cl..........................179/100.41 P, 178/6.6 A

[51] Int. Cl..............................................H04r 17/04

[58] Field of Search......179/100.41 B, 100.41 P, 179/100.41 K, 100.41 J, 100.41 V, 100.41 S; 178/6.6 A; 310/8.2, 8.4, 8.7, 9.1

[56] References Cited

UNITED STATES PATENTS 3,470,395 9/1969 Moffatt...................310/8.2 X

*Primary Examiner*—Bernard Konick
*Assistant Examiner*—Raymond F. Cardillo, Jr.
*Attorney*—Spencer & Kaye

[57] ABSTRACT

A playback head for use with a record disc containing grooves whose walls undulate to constitute a spatial representation of the time variation of a signal to be reproduced, the head including a stylus carried so as to engage in the groove and elastically deform the groove walls to a substantial degree, the playback head also having a transducer arranged to produce an output proportional to the reaction force exerted on the stylus by the elastically deformed groove walls, the transducer being a thickness compression vibrator having a dimension in the direction of the reaction force which is less than one-half the wavelength of a mechanical oscillation produced in the transducer the upper limit frequency of the frequency range to be reproduced.

38 Claims, 5 Drawing Figures

INVENTORS.

Eduard Schüller
Horst Redlich
Gerhard Dickopp
Hans-Joachim Klemp

BY Spencer & Kaye
ATTORNEYS.

INVENTORS.
Eduard Schüller
Horst Redlich
Gerhard Dickopp
Hans-Joachim Klemp

BY Spencer & Kaye
ATTORNEYS.

PRESSURE PICKUP TRANSDUCERS FOR MECHANICALLY STORED SIGNALS

CROSS-REFERENCE TO RELATED APPLICATION

This is a continuation-in-part of our copending application Ser. No. 798,709, filed on Feb. 12th, 1969, now U.S. Pat. No. 3,652,809 and entitled System for Reproducing Mechanically Recorded Signals.

BACKGROUND OF THE INVENTION

The present invention relates to a pickup for scanning stored signals which are recorded in the grooves of record discs in the form of undulations of the groove walls which constitute a spatial representation of the time variation of the signal to be reproduced. To play back such signals, the record disc moves relative to the pickup as the contact surface of the pickup exerts a contact pressure on the disc surface.

With the conventional known prior art techniques of recording and reproducing signals which are stored as deformations in the surface of a physical body — e.g., as vertical or lateral deformations in a cut groove of a record — the mass of the part of the pickup device which is essentially rigidly connected with the pickup stylus and the mass of the stylus itself are kept sufficiently small so that, when the stylus is acted upon by the deformed surface, given the particular elasticity of the record material, the characteristic frequency of these movable members lies above the range of signal frequencies which are recorded. These movable members of the pickup are maintained in alignment with the remainder of the pickup device by a suitably elastic spring which applies a small restoring force to the movable members. This restoring force (the reciprocal value of which is the compliance of the pickup device) also affects the characteristic or resonant frequency of the movable members. The spring is normally arranged directly between the member which is rigidly coupled to and holds the pickup stylus and the pickup transducer — e.g. the piezoelectric crystal — which is used to convert kinetic energy of motion into electrical energy.

According to the well-known principles of mechanical recording, it is necessary to ensure, given particular record groove dimensions and particular radii of curvature for the pickup stylus, that the reductions in the amplitude of stylus deflection caused by the elastic and permanent deformations of the record element material remain small compared to the spatial modulations of the recording groove. Too great a reduction in the stylus deflection amplitude leads to a reduction in the signal level and to distortions in the reproduction.

From these criteria it can be seen that the elastic and permanent deformations which are suffered by record material beneath the pressure of a pickup stylus establish an upper limit in the frequency of mechanical reproduction which is determined by the dimensions of the cooperating surfaces of the pickup stylus and the record, the mechanical resistance or rigidity of the record material, the relative speed between the pickup device and the groove surface as well as by the compressive force applied against the record surface by the stylus. Given the values for these variables which are common in the phonograph or disc recording art, this frequency limit is not very much higher than the frequency range of audible sound.

The publication, "Factors Affecting the Stylus/Groove Relationship in Phonograph Playback Systems" by G. R. Bastiaans, *Journal of the Audio Engineering Society*, (Oct., 1967) Volume 15, No. 4, pp. 389–399, contains a detailed description of the theory of these relationships just mentioned and specifies those signal frequency limits which can not be exceeded with the conventional types of recording discs in use today. Experimental research has substantiated these theoretically obtained results.

In order to reduce the distortion-producing effects of the elasticity of the record element material, it has been suggested that very hard material — i.e., a material having a high modulus of elasticity — be employed. However, as is even noted in the above-cited article, the increase in the forces of contact between such a hard record material (such as nickel, for example) and the pickup stylus, due the the reduction in the contact area, leads to permanent deformations and thus, in turn, to a high rate of wear. Therefore, in order to reduce the deformations of the groove walls of the record and yet keep the deformations within the elastic limits of the material, it is necessary to find a hard material that exhibits a very high yield point.

To increase the usable range of frequencies, and, more particularly, to extend this range upward to include higher frequencies, the above-cited article also suggests the possibility of substantially reducing the contact force of the pickup stylus. This change is only possible if it is accompanied by a simultaneous substantial reduction in the mass of the moving members of the pickup device.

These various possibilities for improving the frequency response and range of a mechanical recording and reproducing system are all directed to techniques for minimizing the cause of distortion; namely, the elastic and permanent deformations of the record material. It is clear that some improvements can be made along these lines since, as noted above, the signal level of present-day recordings reduces to zero at a limit frequency not far above the audible range. However, any improvements in the frequency ranges which can be recorded will be simply improvements in degree, not in kind, and will be accompanied by corresponding increases in cost. In the opinion of the experts in this art, which is typified by the publication cited above, there is an upper frequency limit in the signals which can be picked up from a record by mechanical reproduction and, since this frequency limit is determined by the unavoidable flexibility of elasticity of the record material, it can be displaced upward to some degree, but not overcome.

More recently there has been proposed a technique which departs from the older systems described above and which permits the reproduction of mechanically stored signals occupying a contiguous frequency range far above the frequency limit of conventional systems, i.e. far above the frequency at which deformations of the record material reduce the signal value appearing at the transducer output of a moving mass pickup to zero.

This is accomplished by storing the signals to be reproduced in the grooves of record discs in the form of undulations of the groove walls which constitute a spatial representation of the time variation of the signal to be reproduced and by providing a pickup having a mechanical-electrical transducer and applying the pickup to the disc with a predetermined pressure, the pickup scanning the disc along the groove track. This technique is particularly well suited for reproducing signals constituting a broadband frequency mixture, e.g. television picture signals. The physical characteristics of the disc and the force applied by the pickup are such that the stylus of the pickup head remains substantially stationary and elastically deforms the groove walls to a substantial degree, and the resulting elastic restoring force exerted on the stylus is sensed by a transducer in the pickup head and converted into an electrical signal proportional to such force.

The fixed position of the scanning surface of the pressure pickup and the nature of the record material produce the result that the changes in the shape of the undulation peaks formed on the groove walls are substantially greater than the corresponding movements of the contact surface of the pickup due to the reaction force of the deformed wall portions.

This technique permits an effective reproduction of frequencies above the upper limit frequency encountered in conventional pickups due to the elastic deformations of the record material. This fact, which has been verified by experiment, can be explained as follows:

When a pickup device of the type common in the prior art is employed to sense mechanically recorded deformations or undulations that correspond to signals having a frequency above a certain limit, the pickup stylus will not be able to faithfully follow these deformations. The record material will be too soft to exert a force on the stylus sufficient to accelerate — that is to overcome the inertia of — the stylus and the member rigidly coupled thereto that holds the stylus. Since these conventional pickup devices produce an output signal only when the stylus is subjected to movements of substantial amplitude, the proper reproduction of stored signals at frequencies higher than this so-called limit frequency is, even in theory, impossible.

However, when the stylus of such a conventional pickup device is nevertheless subjected to such deformations which represent signals above the limit frequency, these deformations in the groove walls do exert forces on the stylus which correspond to the recorded signal. Due to the high compliance of the movable members of the pickup, these forces remain relatively small; too small, as noted above, to drive these movable members with sufficient amplitude to produce an electrical signal.

In the system more recently proposed, it is these signal modulated forces produced by the action of the deformations upon a rigid pickup surface which are employed to generate the output signal. The output signal is thus produced by the surface of the record as from a mechanical generator of large internal resistance; i.e., a generator which can produce only very small movements (current) but comparatively large forces (voltage). The mechanical energy is correspondingly received by a pickup with a large input resistance, which includes a transducer body to convert the time dependent compressive forces into modulated electrical signals. Such pressure-sensitive transducers may be realized, for example, by piezoelectric or magnetostrictive transducers or by pressure-sensitive semiconductor elements.

The basic difference between the recently proposed signal reproducing system and the conventional systems of the prior art, therefore, is that the pickup surface of the pressure-sensitive transducer (or, if such is the case, the surface of a member rigidly coupled with this transducer) is not subjected to movements of any substantial amplitude. The compliance of the pickup transducer is made very low in comparison with the conventional moving mass pickups of the prior art, and, in general, considerably lower than that of the record material. With this type of mechanically rigid pressure-sensitive system, even small changes in the compressive forces between stylus and record — changes caused by deformations in the surface of the record that are considerably smaller than the heights of the uncompressed undulations representing the signal — will be sufficient to produce an electrical output voltage.

Whereas the conventional signal reproducing systems of the prior art can be represented ideally as constituting a completely rigid record material and a pickup stylus having no mass and infinite compliance, the relationships in the system according to the more recent proposal, are, in part, just the opposite. In the latter system, the pickup stylus can be visualized as a nearly rigid body having contact surfaces which remain in a constant spatial relationship with the average or undeformed position of the groove walls. Therefore, the compliance can be said to be predominantly localized in the record surface.

In the recently proposed system, the record element material is made sufficiently elastic, compared to the compliance of the contact surface of the pickup device, to permit the elastic deformations of the record surface during playback to be of substantially greater amplitude than the deflections of the pickup.

When the pressure responsive signal reproducing system is in operation, the record surface, which is provided with undulations, is moved past the contact surface of the pickup device. This contact surface (which, in the first approximation, can be considered stationary) continually exerts a compressive force on the record surface which forms the mechanical "bias" of the system. As elemental areas of the undulations, which, as noted above, can be viewed as large numbers of projections extending from an undeformed record surface, pass beneath and come in contact with the pickup surface, they are elastically deformed by the pickup surface so that, during a short period, the position of their surfaces will coincide with the position of the undeformed record surface. This action results in an increase of the compressive forces acting on the pickup surface. Conversely, when the pickup surface passes over a portion of the record surface exhibiting recesses instead of projections, the compressive forces acting on the pickup surface will be reduced. If the mechanical bias — i.e., the compressive force applied by the pickup surface in absence of deformations in the record surface — is properly chosen, the pickup surface will remain in contact with the record surface as it encounters even the deepest recesses in the latter so that the reactive compressive forces will never be allowed to drop to zero.

This technique therefore makes use of the incremental compressive forces due to the elastic deformations of the record material to modulate the pressure-sensitive pickup device. As a result, it make possible the reproduction of signals having a broad, continuous frequency spectrum that extends far above the frequency limits applicable to the signal reproduction systems of the prior art. In particular, it makes possible the mechanical storage and reproduction of signals having frequencies of up to several megahertz (MHz) so that even television picture and sound signals may be mechanically recorded on a record disc-type storage element.

SUMMARY OF THE INVENTION

It is a primary object of the invention to improve the reproduction of signals according to the recently proposed technique.

Another object of the invention is to improve the frequency response of such reproduction.

A further object of the invention is to reduce distortions in the reproduction of signals according to such technique.

It is a specific object of the present invention to provide a pickup device which can accurately reproduce very high frequencies, i.e. frequencies substantially above those recorded on the conventional phonograph record. A pickup device, according to the invention, is intended to play back pictures which were converted into signals of the type employed for television and recorded and duplicated in the manner employed for sound recordings on record discs. In this case, the pickup must be able to reproduce frequencies of up to several MHz from the record.

The transducer according to the invention, which converts the pressure variations into electrical voltages is of the piezoelectric or magnetostrictive type and is advisably a small prismatic member which can vibrate along three orthogonal axes. Such a body can also experience flexural and shear vibrations when these are not prevented by special measures.

It is a further object of the present invention to dimension the transducer, and to install it in the mounting device, to enable it to vibrate in the direction perpendicular to the carrier so that the highest frequencies of the desired range can be mechanically-electrically converted, but that, on the other hand, no interfering resonances from parasitic vibrations in other directions or in conjunction with the coupled elastic surface portions of the record or of the pickup suspension can occur within the frequency range of interest.

The present invention relates to a pressure pickup for scanning a mechanical recording along a predetermined groove in which signals are stored in the form of undulations, the pickup including a mechanical-electrical transducer body, which is stressed by the pressure on the pickup and which undergoes a change of shape so as to convert the pressure exerted on the pickup into an electrical value which varies in response to variations in the reaction force produced by the deformable record surface portions disposed below the pickup surface. The pickup further includes an element presenting a scanning surface which, during scanning, is substantially immovable in the direction of the reaction force exerted by the above-mentioned record surface portions.

This is accomplished according to the present invention by forming the transducer body as a thickness compressional vibrator which has a dimension in the direction of the reaction force which is less than one-half the wavelength of a mechanical oscillation produced in the transducer body at the upper limit of the frequency range to be reproduced.

Preferably, the thickness vibrator may have the shape of a parallelepiped, particularly a cube.

Particularly well suited materials for the vibration transducer are the known ceramic materials lead-zirconate-titanate or potassium-sodium-niobate, since their frequency constants result in physical dimensions which permit relatively simple manufacture. Thus, for example, when a certain lead-zirconate-titanate is used, a length in the direction toward the carrier of approximately 0.2 mm results for a limit frequency of 4–5 MHz. This value depends on the specific material and its frequency constant.

The frequency constant — measured in $Hz \cdot m$ or in $m/s$ — is the product of the mechanical resonant frequency and the value of that dimension which determines this frequency and is equal to one-half the speed of sound occurring in the ceramic material, except for the case of disc-type oscillators.

However, when the above-mentioned 0.2 mm thick material is excited at a point, it experiences many types of vibrations whose resonance frequencies could fall within the range to be reproduced. It has been found that this can be prevented by giving the transducer approximately the shape of a cube. This causes all parasitic resonant oscillations to lie outside of the frequency range to be reproduced.

The pickup device could be so designed that the ceramic body slides directly on the record. Because of the high amount of friction, however, both the record and the ceramic body will experience a high degree of wear. It is therefore proposed, in accordance with the present invention, to connect a skid-type stylus of a wear-resistant material, preferably diamond, whose mass is less than that of the transducer body, rigidly with that surface of the ceramic transducer body which faces the record.

This stylus, which is attached to the entire surface of the transducer body, not only prevents wear but also makes it possible to damp oscillations which could develop in the transducer, for example in the direction of relative movement between the pickup and the record. It is thus possible to make the transducer somewhat larger in this direction, approximately twice as large, which facilitates fabrication. The different frequency constants in the different oscillation directions can then be taken into consideration.

Since the resonance frequency of the transducer is decreased by the rigid coupling of the mass of the stylus, the transducer must be so dimensioned that its resonance frequency still remains above the transmission range, having an upper limit of, for example, 4–5 MHz.

In order for the transducer body to be able to operate as a $\lambda/2$ oscillator, where $\lambda$ = wavelength of mechanical oscillations in the transducer, it must be yieldably fastened in its mount. In this case it vibrates approximately about its center of mass since the transducer surface connected to its mount can then move by approximately the same amount as the surface connected to the stylus.

This soft suspension, however, also permits vibrations of the entire transducer mass. So that these will not have an interfering effect on the signal reproduction, the synthetic material should have a high internal damping and it should have an elasticity value such that the resulting resonance frequency of the system lies below the upper limit of the recorded frequency range.

The transducer converts the pressure forces corresponding to the compression of the undulation peaks on the record into electrical voltages which must be fed from the transducer to a suitable processing circuit. The very small transducer must not be subjected to the adverse influence of stiff and, compared to the transducer, rather heavy connecting wires.

It would be conceivable to metallize the upper and lower surfaces of the transducer and to solder on the required connecting wires. This might cause difficulties, however, in that the connection of the stylus with the ceramic transducer body would not be rigid enough. Moreover, with this arrangement, the connecting wires could also produce distortions.

According to a further embodiment of the present invention, metal coatings are applied to the opposed surfaces of the piezoelectric ceramic body which are in the main normal record surface and in a further embodiment moreover parallel to the direction of relative stylus record movement so that the body is thus polarized transverse to the direction of the record reaction force and the direction of relative movement between the stylus and the record. Then the connecting wires can be cemented onto the coatings by means of an elastic conductive lacquer and, if required, could be held fast to the damping element disposed between the transducer and its mount. Thus the mechanical resonance frequency of the transducer will hardly be influenced.

One of the two wire contact surfaces, inclusive of the connecting parts, is preferably covered with an elastic insulating lacquer whereupon the entire transducer can then be provided with a shielding composed of a thin vapor-deposited metal layer.

Instead of a damping element between the transducer and its mount, it is also possible to employ an elastic adhesive lacquer to connect the transducer with its mount. If the lacquer is applied with a sufficient thickness, the elastic damping member can be entirely eliminated, which represents a simplification in the manufacture of the item.

The diamond stylus, which, as mentioned above, has its entire surface fastened to the pressure receiving surface of the transducer as rigidly as possible, e.g. by means of a hard adhesive, has the shape of a triangular prism with one prism edge extending into the record groove. This edge should be rounded in such a manner that the stylus slides approximately on the medial line of each wall of the groove, because along the upper edges of the groove the modulation may be irregularly deformed by the cutting process. At the bottom of the groove, accumulated dust particles may also produce distortions.

The entire transducer is so designed, for playback, that the lower, or leading, edge of the stylus forms a small acute angle with the record surface in the direction of relative movement. The trailing edge of the stylus, with respect to the direction of movement of the stylus relative to the record, then extends approximately perpendicularly to the record surface. This assures good guidance in the groove and the desired pressure modulation in the direction of the trailing edge.

In order to prevent torsional vibrations, it is advisable to fasten the pickup to the supporting pickup arm in such a manner that the center line of the major portion of the arm passes through approximately the point of contact of the scanning stylus with the record. The length of the pickup arm and the characteristics of its support must be so selected that the deflection hardness with respect to low frequency distortion voltages which may be produced by wobble of the record is very low. The playback fidelity can then no longer be impaired thereby. The spring constant both perpendicular and parallel to the record plane should be less than 1 pond/mm (a pond is the force produced by one gram at sea level. The resilient material itself and/or the bearing point of the arm must have a high internal damping.

DESCRIPTION OF THE PREFERRED EMBODIMENTS

Figure 1:
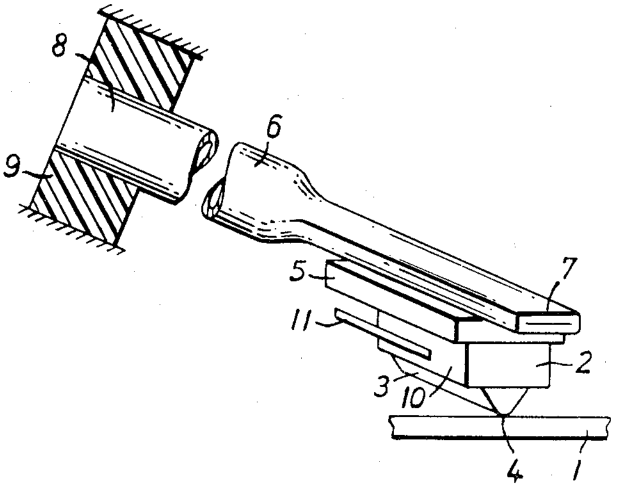
FIG. 1 is a perspective view of a pickup, according to the invention, with its mount.

In FIG. 1 there is shown a record disc 1 whose surface is provided with undulations corresponding to the time sequence of the signal to be reproduced, and a ceramic body 2 which serves as the pressure receiver and transducer. A stylus 3 of a wear-resistant material, such as diamond, in the general shape of a triangular prism is cemented to the ceramic body 2 by means of a hard adhesive and moves with its tip 4 in the groove of record 1.

An essential ingredient of this adhesive may be cyan acrylate. The cementing adhesive may consist of a layer of "Sicomet 85," a product of the "Sichelwerke"-corporation in Hannover/Western Germany or of "Araldit AZ 15/HZ 15" of the "Ciba"-corporation in Basel/Switzerland. For the purpose of rigid connection of the prism to the ceramic body a thickness of the adhesive layer of about 1 to 4 $\mu$m is preferred. The prism forms a small acute angle of, for example, 3°–10° with the record in the direction of relative movement. It should here be noted that while the stylus 3 may also have a shape other than prismatic, the prism shape simplifies the establishment of a firm connection with the relatively small ceramic body 2 which — as already mentioned above — must not be any thicker than about 0,2 mm for playing back frequencies of up to 4–5 MHz. For this frequency range, the stylus tip 4 could have a radius of curvature of about 4 $\mu$ in a plane normal to the groove axis and a radius of curvature of about 0.2 $\mu$ in a plane containing the groove axis and normal to the plane of the disc.

The ceramic body 2 is fastened to mount 6, which has the shape of a light-weight aluminum tube with a flattened end 7, via an elastic molded piece 5 of a soft synthetic material.

The synthetic material may be a fluor elastomer, with a shore-A-hardness of about 70 to 80, e.g. "Viton," a product of the "E.I. Dupont De Nemours & Co"-corporation (INC) in Wilmington, Delaware 19898, USA.

Tube 6 has its free end 8 fastened in a cushion 9 of a yieldable synthetic material having high internal damping. The cushion may be a cured silicone rubber material of a shore-A-hardness of about 50 to 60 combined with about 1 to 4 per cent by weight of a hardener, the combination having a density of about 1,2 g/cm$^3$. The silicone rubber material and the hardener, called hardener "T" are obtainable from the "Wacker-Chemie GmbH" a Corporation of München in Western Germany.

The side surfaces 10 of the transducer are metallized in any well-known manner and provided with electrical output connections 11 which are soldered on or glued on by means of an elastic conductive lacquer.

Any elastic adhesive filled with metal powder is suitable as such a conductive lacquer, for example "Leitlack 200," a product of the "Degussa"-corporation in Frankfurt/Main in Western Germany.

Figure 2:
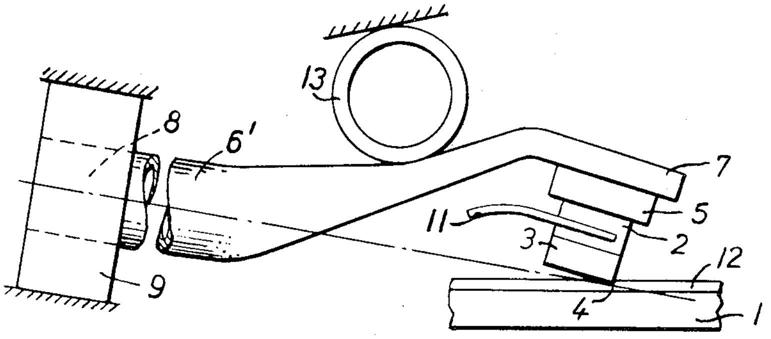
FIG. 2 is a side view of a modified version of the pickup of FIG. 1.

FIG. 2 is a side view of a somewhat modified embodiment of the invention. Parts identical with those of FIG. 1 are provided with the same reference numerals as in FIG. 1. In FIG. 2, a groove 12 of record 1 is also shown. It can be seen that the scanning tip 4 of the stylus 3 slides against the two walls of groove 12, approximately midway between the top and bottom of each wall. The arm 6' is so bent that the center line of its major portion passes approximately through the point of contact of tip 4 with record 1. This prevents torsional vibrations by reducing to approximately zero the moment arm associated with lateral forces applied to tip 4. It has been found in practice that the damping in bearing 9 is often not sufficient to prevent all parasitic vibrations. In such cases an additional damping can be provided in the form of a rubber ring 13 having internal damping and held in contact with arm 6'.

In the embodiments of FIGS. 1 and 2 the arm 6 or 6' is mounted directly in a damping cushion 9. It is also possible, however, to support the arm with a resilient wire having a round or profiled cross-section in order to reduce the deflection hardness of the pickup. It is here advisable to additionally damp the resilient material or to employ a material with high internal damping.

Figures 4, 5:
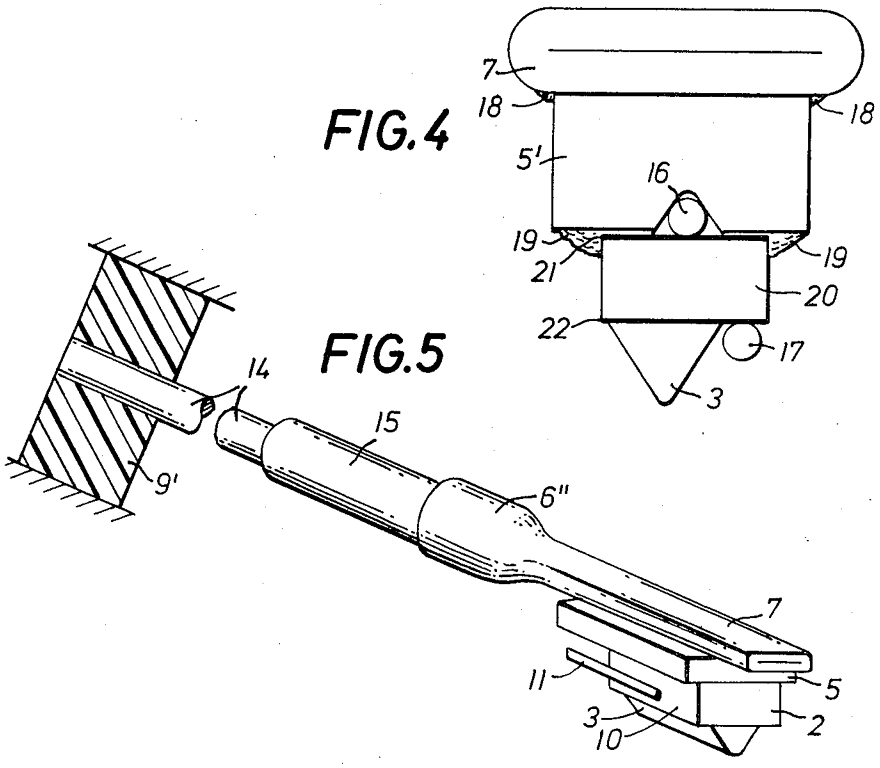
FIG. 4 is a front view of the pickup of FIG. 3.
FIG. 5 is a perspective view of a pickup as shown in FIG. 1 but with modified mounting means.

FIG. 5 is a perspective view of such an embodiment with a pickup similar to that of FIG. 1 but with a modified mount. A resilient wire 14 is mounted directly in a damping cushion 9'. The wire having a round cross-section supports the arm 6'' fixed thereon. A damping coating 15 covers the resilient wire 14 in order to damp it. The parts of FIG. 5 which do not differ from those of FIG. 1 are provided with the same reference numerals as in FIG. 1.

Figure 3:
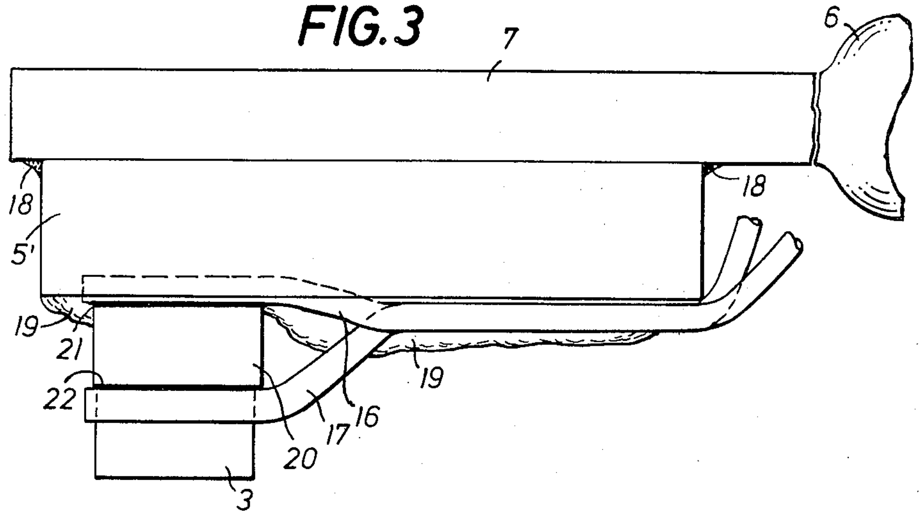
FIG. 3 is a side view of another version of a pickup.

FIG. 3 is a side view of another version of a pickup. This is shown in a front view in FIG. 4, i.e. in a view from the left margin of FIG. 3. Both Figures have a more enlarged scale in comparison to FIGS. 1, 2, and 5.

In the FIGS. 3 and 4 parts identical with those of FIG. 1 are provided with the same reference numerals as in FIG. 1. The top and bottom surfaces 21 and 22 of a ceramic body 20 are metallized in any well-known manner and provided with electrical output connections 16 and 17 respectively which are bonded or glued on by means of an elastic conductive lacquer. The ceramic body 20 is polarized in vertical direction. It is fastened to the flattened end 7 of a mount 6 via an elastic molded piece 5' which is somewhat longer than the piece 5 of FIG. 1. The fastening of the piece 5' to the end 7 is achieved by an adhesive 18 whilst the ceramic body and the connections 16 and 17 are fastened to the piece 5' by a cast resin or sealing compound 19.

The arm 6, 6' odor 6'' must be enabled to move in order to permit the stylus 3 to move from the rim toward the center of the record 1 or vice versa. For this purpose the damping cushion may be fixed in a sliding member which will be transported by a cord drive. This may be driven by means of a worm drive from the driving motor of the record.

As aforementioned the transducer or ceramic body 2 is polarized in a certain direction. The polarization of a piezoelectric ceramic body will be achieved by applying a voltage of about 5,000 volts per one millimeter thickness of the ceramic body at its contact surfaces. After this the ceramic body is to be heated until a current of about 0.1 $\mu$A flows from one contact surface through the ceramic body to the other surface. After cooling the ceramic body to room temperature the voltage may be removed and the ceramic body is now polarized. By the polarization there is achieved that a voltage will arise between the contact surfaces of the ceramic body if a pressure force tries to deform the body.

It will be understood that the above description of the present invention is susceptible to various modifications, changes and adaptations, and the same are intended to be comprehended within the meaning and range of equivalents of the appended claims.

We claim:

1. In a pressure pickup for scanning a record along a predetermined track in which signals are stored in an elastically deformable surface portion in the form of undulations constituting a spatial representation of the stored signals, the pickup including means defining a scanning surface arranged to bear against the record surface to compress at least the undulation peaks and being connectable to a support for maintaining the pickup substantially stationary during scanning in the direction of the reaction force exerted thereon by the surface portion, and mechanical-electrical transducer body means connected to be stressed by the reaction force on the scanning surface and to convert such stress into an electrical value which varies in accordance with variations in the reaction forces produced by the deformable surface portions disposed at each instant under the scanning surface, the improvement wherein said transducer body means is a thickness compression vibrator which has a dimension in the direction of the reaction force which is less than one-half the wavelength of a mechanical oscillation in said transducer body means at the upper limits of the stored signal frequency range.

2. In a pressure pickup for scanning a record along a predetermined track in which signals are stored in an elastically deformable surface portion in the form of undulations constituting a spatial representation of the stored signals, the pickup including means defining a scanning surface arranged to bear against the record surface to compress at least the undulation peaks and to be substantially stationary during scanning in the direction of the reaction force exerted thereon by the surface portion, and mechanical-electrical transducer body means connected to be stressed by the reaction force on the scanning surface and to convert such stress into an electrical value which varies in accordance with variations in the reaction forces produced by the deformable surface portions disposed at each instant under the scanning surface, the improvement wherein said transducer body means is a thickness compression vibrator which has a dimension in the direction of the reaction force which is less than one-half the wavelength of a mechanical oscillation in said transducer body means at the upper limits of the stored signal frequency range.

3. An arrangement as defined in claim 2 wherein said transducer body is provided with two connecting points at respectively opposed contact surfaces and further comprising electrical connections connected to said connecting points, an electrically insulating lacquer covering at least one of said two connecting points for said electric connections at said transducer body means, and a shielding of a thin vapor-deposited metal layer covering said pickup.

4. An arrangement as defined in claim 2 wherein said transducer body means consists of a piezo electric ceramic body whose direction of polarization in the main is perpendicular to the reaction force and further comprising electrical connections at lateral contact surfaces of said ceramic body which are perpendicular to the direction of polarization.

5. An arrangement as defined in claim 2 further comprising support means supporting said pickup for maintaining it substantially stationary in the direction of the reaction force exerted thereon by the surface portion.

6. An arrangement as defined in claim 2 wherein said transducer body means consists of a piezoelectric ceramic body whose direction of polarization is parallel to the reaction force further comprising electric connections at contact surfaces of said ceramic body which are perpendicular to the direction of polarization.

7. An arrangement as defined in claim 6 wherein said electrical connections are soldered to the contact surfaces.

8. An arrangement as defined in claim 6 wherein said electrical connections at the contact surfaces comprise a conductive lacquer.

9. An arrangement as defined in claim 2 wherein said transducer body means consists of a piezoelectric ceramic body whose direction of polarization is perpendicular to the reaction force and to the direction of relative movement between the record and said pickup and further comprising electrical connections at lateral contact surfaces of said ceramic body which are perpendicular to the direction of polarization.

10. An arrangement as defined in claim 9 wherein said electrical connections are soldered to the lateral contact surfaces.

11. An arrangement as defined in claim 9 wherein said electrical connections at the contact surfaces comprise a conductive lacquer.

12. An arrangement as defined in claim 2 wherein said pickup further comprises a mount and a mass of elastic synthetic material having high internal damping and fastening said transducer body means to said mount.

13. An arrangement as defined in claim 12 wherein said mount is constituted by an aluminum tube.

14. An arrangement as defined in claim 12 wherein the resonance frequency of said transducer body means together with said elastic material mass lies below the upper limit of the frequency range of the stored signals.

15. An arrangement as defined in claim 12 further comprising an electrical connection to said transducer body means disposed at said elastic mass between said transducer body means and said mount.

16. An arrangement as defined in claim 12 wherein the center line of the major portion of said mount passes approximately through the point of contact between said scanning surface and the record.

17. An arrangement as defined in claim 12 wherein said elastic mass between said transducer body means and said mount is constituted by an adhesive joint.

18. An arrangement as defined in claim 12 further comprising a bearing supporting said mount and wherein the length of said mount and said bearing are so selected with respect to elasticity and damping that the deflection hardness of said pickup with respect to low frequency distortion oscillations is so low that such oscillations do not produce an interfering effect on the output signal.

19. An arrangement as defined in claim 18 wherein the spring constant of said mount both perpendicular and parallel to the record surface is less than about 1 pond /mm.

20. An arrangement as defined in claim 18 further comprising additional damping means contacting said mount.

21. An arrangement as defined in claim 20 wherein said additional damping means comprise a rubber ring with internal damping in contact with said mount on the side opposite said transducer body means.

22. An arrangement as defined in claim 18 wherein said bearing has a high internal damping, and further comprising a wire connecting said mount to said bearing.

23. An arrangement as defined in claim 22 wherein said wire has a damping coating.

24. An arrangement as defined in claim 2 wherein said transducer body means has the shape of a parallelepiped.

25. An arrangement as defined in claim 24 wherein said transducer body means is a piezoelectric element.

26. An arrangement as defined in claim 24 wherein said transducer body means is a magnetostrictive element.

27. An arrangement as defined in claim 24 wherein said transducer body means is a pressure-sensitive semiconductor device.

28. An arrangement as defined in claim 24 wherein said transducer body means is substantially cube-shaped.

29. An arrangement as defined in claim 24 wherein said transducer body means consists of a ceramic material.

30. An arrangement as defined in claim 29 wherein said ceramic material is lead-zirconate-titanate.

31. An arrangement as defined in claim 29 wherein said ceramic material is potassium-sodium-niobate.

32. An arrangement as defined in claim 24 wherein said means defining a scanning surface comprise a wear-resistant stylus rigidly connected to the surface of said transducer body means facing the record.

33. An arrangement as defined in claim 32 wherein said stylus is made of diamond.

34. An arrangement as defined in claim 32 wherein the mass of said stylus is less than that of said transducer body means.

35. An arrangement as defined in claim 32 wherein the resonance frequency of the unit formed by said transducer body means and said stylus, which oscillates about their common center of mass, lies above the upper limit of the frequency range of the stored signals.

36. An arrangement as defined in claim 32 wherein said stylus is oriented to form a small acute angle of approximately 3°—10° with the record and has a trailing edge, with respect to the direction of movement of said stylus relative to the record, oriented approximately perpendicular to the record plane and to the direction of relative movement.

37. An arrangement as defined in claim 32 wherein said stylus has the shape of a triangular prism.

38. An arrangement as defined in claim 37 wherein the signals are stored in record grooves whose walls are provided with the undulations and the lower tip of said stylus is rounded and dimensioned to slide approximately in contact with the medial lines of the two walls of the grooves.

* * * * *